Nov. 17, 1931.  C. H. ENNIS  1,832,193
TRIANGULAR GARDEN HOE
Filed April 4, 1928
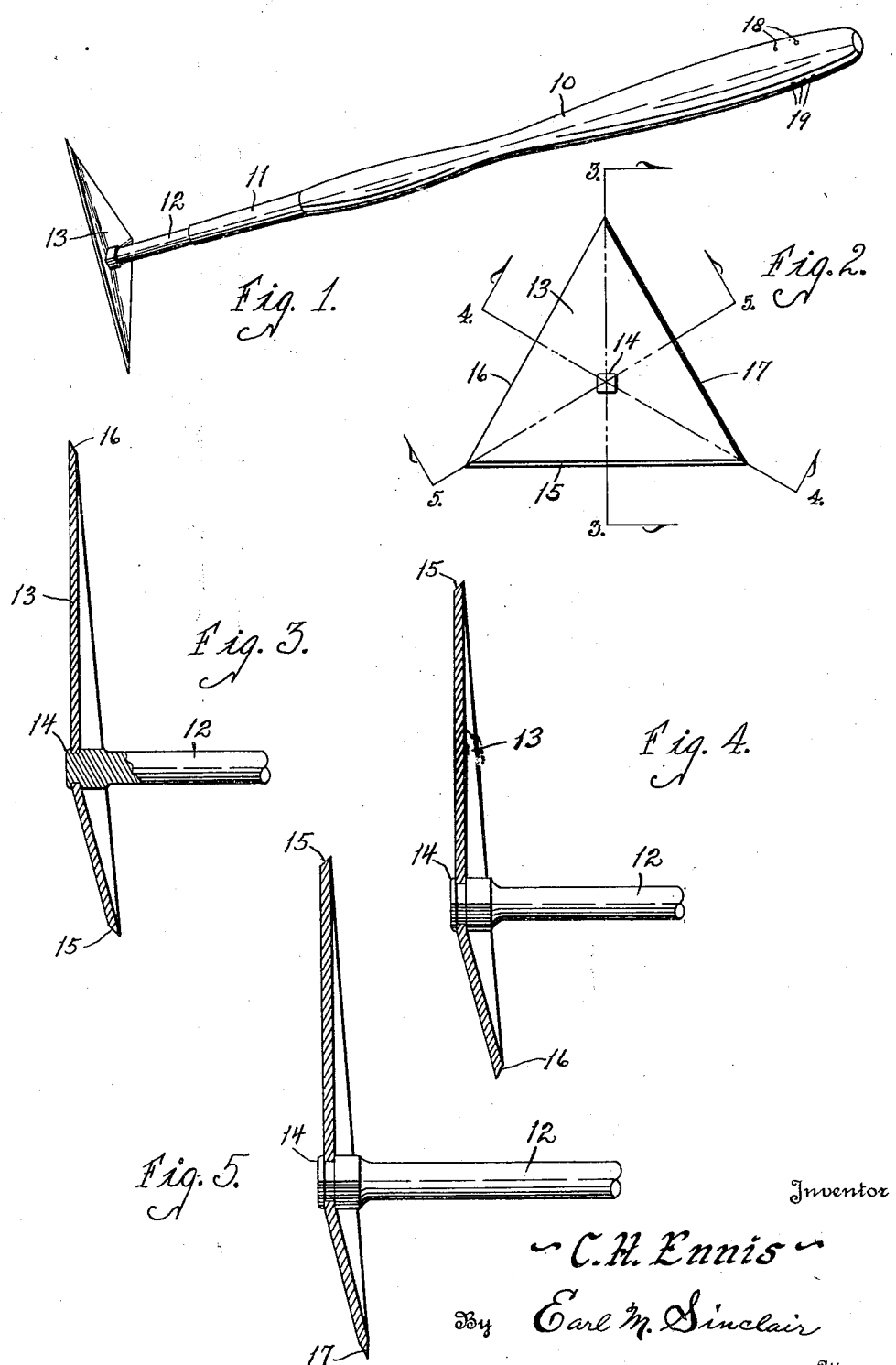

Patented Nov. 17, 1931

1,832,193

UNITED STATES PATENT OFFICE

CHARLES H. ENNIS, OF ROME, IOWA

TRIANGULAR GARDEN HOE

Application filed April 4, 1928. Serial No. 267,271.

The object of this invention is to provide an improved construction for a hoe having a multiple-edged blade adapting it for various uses and purposes.

A further object is to provide a garden hoe having a triangular blade, each edge of which is sharpened or beveled to produce a cutting edge and all of the edges being different from the others to better adapt them for special uses.

Another object of my invention is to provide a garden hoe having a blade which is substantially in the form of an equilateral triangle, thus producing a well balanced instrument and one which is especially adapted for the forming of symmetrical trenches in the soil.

A further object of the invention is to provide an improved hoe which is economical to manufacture, very efficient in use and adapted for a variety of functions and purposes.

With these and other objects in view, my invention consists in the construction, arrangement and combination of elements hereinafter set forth, pointed out in the claims and indicated by the accompanying drawings in which—

Fig. 1 is a perspective view showing my improved hoe.

Fig. 2 is a forward end view of the same.

Fig. 3 is a section through the blade on the line 3—3 of Fig. 2.

Fig. 4 is a similar view on the line 4—4 of Fig. 2.

Fig. 5 is a similar view on the line 5—5 of Fig. 2.

I have employed the numeral 10 to designate a handle having at its forward end a ferrule 11, with a shank 12 projecting forwardly therefrom.

A blade 13 is provided which is of triangular form in front and rear elevation and preferably of substantially the shape of an equilateral triangle. The blade 13 preferably is slightly concavo-convex in cross-section and is arranged with its convex side forwardly. The blade 13 is formed at its center with an aperture to receive the shank 12 and the portion of the shank which extends through said hole preferably is reduced and is angular in cross-section, fitting snugly to the hole in the blade so that the blade is effectively prevented from turning on the handle. The blade may be secured to the shank in any suitable manner, as by upsetting the projecting forward end of the shank, as clearly shown at the point 14 in Fig. 3.

Each of the three edges of the blade preferably is sharpened or beveled to produce a cutting edge and the method of beveling preferably is different as to all three edges. One edge, which I have designated by the numeral 15 in Fig. 3, is beveled on its forward face and another edge, which I have designated by the numeral 16 in Fig. 4, is beveled on its rear face, while the third edge, which I have designated by the numeral 17 in Fig. 5, is beveled on both faces.

This provides a hoe which is adapted for a variety of uses, since a forward beveled cutting edge will be found better for some purposes and a rear beveled cutting edge will be found better for other purposes. A doubly beveled cutting edge such as 17 will probably be found superior to either of the others for general use, particularly where it is necessary to cut roots or weeds which have become large and dry so that a single edged hoe cannot easily cut them.

To guide the user in selecting the proper edge of the hoe at any time, I have provided markers in the handle, as shown in Fig. 1. For instance, the marker for the cutting edge 15 may consist of two dots on the handle at 18, which dots preferably are uppermost when the cutting edge 15 is arranged downwardly in position for use. Similarly, three dots may be used at the point 19 on the handle to designate the cutting edge 17, while other suitable marking means (not shown) may be employed to designate the cutting edge 16. The user, knowing which marker applies to each edge, needs only to notice which marker is uppermost in his hand to indicate the desired cutting edge at a given time.

Since the blade 13 is of symmetrical shape and is mounted at its center, it follows that the hoe is well balanced in the hands of the user, no matter which edge or point of the blade is in use.

It will be obvious that any one of the points of the blade may be employed for removing weeds or undesired growth from points near a plant and that this may be done very easily and quickly without the necessity of the operator stopping or bending and without much danger of injury to the plant.

The shape of the blade also facilitates the making of trenches in the earth for the planting of seeds and these trenches will be uniform and symmetrical, with both sides of the trench alike, thus making it possible to cover the seeds uniformly and promote uniform germination and growth.

It is obvious that changes may be made in the mounting of the shank on the handle and the mounting of the blade on the shank and I do not desire to be understood as limiting myself to the precise form herein shown and described except as defined within the scope of the claims.

I claim as my invention:

1. A hoe of the class described, comprising a handle, a shank carried by the handle, and a blade carried by the shank, said blade being substantially of the form of an equilateral triangle, all of the edges of said triangular blade being beveled differently from each other.

2. A hoe of the class described, comprising a handle, a shank carried by the handle, and a blade carried by the shank, said blade being substantially of the form of an equilateral triangle, all of the edges of said triangular blade being beveled differently from each other, together with indicating means on the handle peculiar to and designed to distinguish each of the cutting edges.

3. A hoe of the class described, comprising a handle, a shank carried by the handle, and a blade carried by the shank, said blade being substantially of the form of an equilateral triangle, all of the edges of said triangular blade being beveled differently from each other and all meeting at sharp points, said shank being secured at the approximate center of said blade.

CHARLES H. ENNIS.